(12) United States Patent
    Richards et al.

(10) Patent No.: US 10,889,965 B2
(45) Date of Patent: Jan. 12, 2021

(54) ARTICULATION SYSTEM FOR AN EARTHMOVING MACHINE

(71) Applicant: Caterpillar Inc., Deerfield, IL (US)

(72) Inventors: Travis Neale Richards, Chillicothe, IL (US); Ernest Everett Stoops, Decatur, IL (US); Michael Lemoyne Repscher, Taylorville, IL (US); Matthew David Roley, Morton, IL (US); Ramalho Stive, Isle d'Abeau (FR); Michael Robert Kunde, Decatur, IL (US); Dwanz Mwalimu Mwasi, Seco Green Valley, AZ (US); Charles Eric Nail, Macon, IL (US); Bart Jerome Bradford, Mt. Zion, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/436,959

(22) Filed: Jun. 11, 2019

(65) Prior Publication Data
    US 2020/0392702 A1    Dec. 17, 2020

(51) Int. Cl.
    *E02F 9/22*     (2006.01)
    *B62D 12/00*    (2006.01)
    *E02F 9/08*     (2006.01)

(52) U.S. Cl.
    CPC ............ *E02F 9/2285* (2013.01); *B62D 12/00* (2013.01); *E02F 9/0841* (2013.01); *E02F 9/225* (2013.01); *E02F 9/2296* (2013.01); *F15B 2211/205* (2013.01); *F15B 2211/3051* (2013.01); *F15B 2211/3056* (2013.01); *F15B 2211/40553* (2013.01); *F15B 2211/575* (2013.01); *F15B 2211/8609* (2013.01)

(58) Field of Classification Search
    CPC ......... B62D 12/00; B62D 12/02; F15B 13/01; F15B 21/047; F15B 2211/8609
    See application file for complete search history.

(56) References Cited

U.S. PATENT DOCUMENTS

| 4,286,684 | A | * | 9/1981 | Berg ...................... B62D 5/32 180/403 |
| 5,269,389 | A |   | 12/1993 | Tomiyoshi et al. |
| 5,320,191 | A | * | 6/1994 | Sudo ...................... B62D 5/09 180/442 |
| 5,908,081 | A |   | 6/1999 | Olson |

(Continued)

*Primary Examiner* — Abiy Teka
*Assistant Examiner* — Michael Quandt
(74) *Attorney, Agent, or Firm* — Jeff A. Greene

(57) ABSTRACT

A hydraulic circuit for a pair of cylinders of an articulation system includes a pump, a reservoir, a directional control valve (DCV), a pair of actuator valves (AVs) and an articulation charge circuit (ACC). The DCV is fluidly coupled to the pump, the reservoir and the pair of cylinders via a supply line, a fluid return line and a pair of cylinder supply lines (CSLs) respectively. Each CSL has a load check valve (LCV) therein. The AVs are fluidly coupled with the DCV and the pump via a pilot supply line (PSL) for actuating movement of the DCV. The ACC, associated with the PSL and each cylinder supply line downstream of the associated LCV, charges a corresponding CSL with fluid from the PSL for increasing a pressure in the corresponding CSL when the pressure in the corresponding CSL falls below the pressure of fluid associated with the PSL.

20 Claims, 2 Drawing Sheets

(56) References Cited

U.S. PATENT DOCUMENTS

| | | | | |
|---|---|---|---|---|
| 7,200,993 B2* | 4/2007 | Khalil | ................... | B62D 5/09 |
| | | | | 60/403 |
| 7,610,989 B2* | 11/2009 | Vigholm | ................ | B62D 1/22 |
| | | | | 180/418 |
| 8,352,127 B2* | 1/2013 | Wahlstrom | ............... | B62D 1/22 |
| | | | | 701/42 |
| 8,668,044 B2* | 3/2014 | Tamura | ................... | B62D 5/06 |
| | | | | 180/441 |
| 2012/0152629 A1 | 6/2012 | Mather | | |

* cited by examiner

ARTICULATION SYSTEM FOR AN EARTHMOVING MACHINE

TECHNICAL FIELD

The present disclosure relates to an articulation system for an earthmoving machine and, more particularly, to a hydraulic circuit for an articulation system of an earthmoving machine.

BACKGROUND

Earthmoving machines such as, but not limited to, motor graders include a front frame and a rear frame pivotally coupled to each other using an articulation joint. Such earthmoving machines are provided with an articulation system for articulating the front frame relative to the rear frame. The articulation system typically includes a pair of double-acting hydraulic cylinders that are provided on a pair of opposing sides of the machine and located between opposing ends of the front and rear frames. Each of these double-acting hydraulic cylinders typically include a piston that is disposed in a cylinder chamber to define a cap end chamber and a rod end chamber.

When articulating the front frame in a first direction relative to the rear frame, for example, in a clockwise direction about an axis of the articulation joint, the cap end chamber of a first hydraulic cylinder and the rod end chamber of a second hydraulic cylinder may be pressurized while the rod end chamber of the first hydraulic cylinder and the cap end chamber of the second hydraulic cylinder are simultaneously depressurized i.e., by allowing fluid from the rod end chamber of the first hydraulic cylinder and the cap end chamber of the second hydraulic cylinder to return to a reservoir. Conversely, when articulating the front frame in a second direction relative to the rear frame, for example, in a counter-clockwise direction about the axis of the articulation joint, the rod end chamber of the first hydraulic cylinder and the cap end chamber of the second hydraulic cylinder may be pressurized while the cap end chamber of the first hydraulic cylinder and the rod end chamber of the second hydraulic cylinder are simultaneously depressurized.

However, in some cases, for example, due to aging of the machine, loosening between the pins and bushings of the cylinders, the opposing ends of the front and rear frames and/or the articulation joint itself, and a drift i.e., deviation may occur from the articulation angle that is desired, or required, between the front and rear frames of the machine.

Hence, there is a need an improved articulation system that overcomes the aforementioned drift between the front and rear frames of the machine.

SUMMARY OF THE DISCLOSURE

In accordance with one aspect of the present disclosure, a hydraulic circuit is provided for a pair of cylinders that are associated with an articulation system of an earthmoving machine. The hydraulic circuit includes a pump, a reservoir, a directional control valve, a pair of actuator valves and an articulation charge circuit. The directional control valve is fluidly coupled to the pump and the reservoir via a supply line and a fluid return line respectively. The directional control valve is also disposed in fluid communication with the pair of cylinders via a pair of cylinder supply lines. The pair of cylinder supply lines have a pair of load check valves disposed therein. The pair of actuator valves are disposed in fluid communication with the pump via a pilot supply line and the directional control valve. Each actuator valve is configured to selectively actuate movement of the directional control valve. The articulation charge circuit is associated with the pilot supply line and the pair of cylinder supply lines downstream of the pair of load check valves. The articulation charge circuit has a pilot feed line branched-off from the pilot supply line at a point located downstream of the pair of actuator valves. The pilot feed line has an orifice disposed therein and is configured to branch into a pair of pilot feed branch lines downstream of the orifice. Further, the pair of pilot feed branch lines are fluidly coupled with the pair of cylinder supply lines downstream of the pair of load check valves. Furthermore, the pair of pilot feed branch lines are provided with a pair of check valves disposed therein such that each check valve operably charges a corresponding cylinder supply line downstream of the pair of load check valves with fluid from the pilot supply line, via the pilot feed line and the orifice, for increasing a pressure in the corresponding cylinder supply line downstream of the pair of load check valves when the pressure in the corresponding cylinder supply line falls below the pressure of fluid associated with the pilot feed branch line coupled thereto.

In accordance with another aspect of the present disclosure, an articulation system of an earthmoving machine includes a pair of cylinders, a pump, a reservoir, a directional control valve, a pair of actuator valves and an articulation charge circuit. The directional control valve is fluidly coupled to the pump and the reservoir via a supply line and a fluid return line respectively. The directional control valve is also disposed in fluid communication with the pair of cylinders via a pair of cylinder supply lines. The pair of cylinder supply lines have a pair of load check valves disposed therein. The pair of actuator valves are disposed in fluid communication with the pump via a pilot supply line and the directional control valve. Each actuator valve is configured to selectively actuate movement of the directional control valve. The articulation charge circuit is associated with the pilot supply line and the pair of cylinder supply lines downstream of the pair of load check valves. The articulation charge circuit has a pilot feed line branched-off from the pilot supply line at a point located downstream of the pair of actuator valves. The pilot feed line has an orifice disposed therein and is configured to branch into a pair of pilot feed branch lines downstream of the orifice. Further, the pair of pilot feed branch lines are fluidly coupled with the pair of cylinder supply lines downstream of the pair of load check valves. Furthermore, the pair of pilot feed branch lines are provided with a pair of check valves disposed therein such that each check valve operably charges a corresponding cylinder supply line downstream of the pair of load check valves with fluid from the pilot supply line, via the pilot feed line and the orifice, for increasing a pressure in the corresponding cylinder supply line downstream of the pair of load check valves when the pressure in the corresponding cylinder supply line falls below the pressure of fluid associated with the pilot feed branch line coupled thereto.

In yet another aspect of the disclosure, an articulated machine includes a front frame and a rear frame that are pivotally coupled by an articulation joint, and an articulation system that is associated with the front and rear frames. The articulation system includes a pair of cylinders located between the front and rear frames. The articulation system further includes a pump, a reservoir, a directional control valve, a pair of actuator valves and an articulation charge circuit. The directional control valve is fluidly coupled to the pump and the reservoir via a supply line and a fluid return line respectively. The directional control valve is also disposed in fluid communication with the pair of cylinders via a pair of cylinder supply lines. The pair of cylinder supply lines have a pair of load check valves disposed therein. The pair of actuator valves are disposed in fluid communication with the pump via a pilot supply line and the directional control valve. Each actuator valve is configured to selectively actuate movement of the directional control valve. The articulation charge circuit is associated with the pilot supply line and the pair of cylinder supply lines downstream of the pair of load check valves. The articulation charge circuit has a pilot feed line branched-off from the pilot supply line at a point located downstream of the pair of actuator valves. The pilot feed line has an orifice disposed therein and is configured to branch into a pair of pilot feed branch lines downstream of the orifice. Further, the pair of pilot feed branch lines are fluidly coupled with the pair of cylinder supply lines downstream of the pair of load check valves. Furthermore, the pair of pilot feed branch lines are provided with a pair of check valves disposed therein such that each check valve operably charges a corresponding cylinder supply line downstream of the pair of load check valves with fluid from the pilot supply line, via the pilot feed line and the orifice, for increasing a pressure in the corresponding cylinder supply line downstream of the pair of load check valves when the pressure in the corresponding cylinder supply line falls below the pressure of fluid associated with the pilot feed branch line coupled thereto.

Other features and aspects of this disclosure will be apparent from the following description and the accompanying drawings.

DETAILED DESCRIPTION

Figure 1:
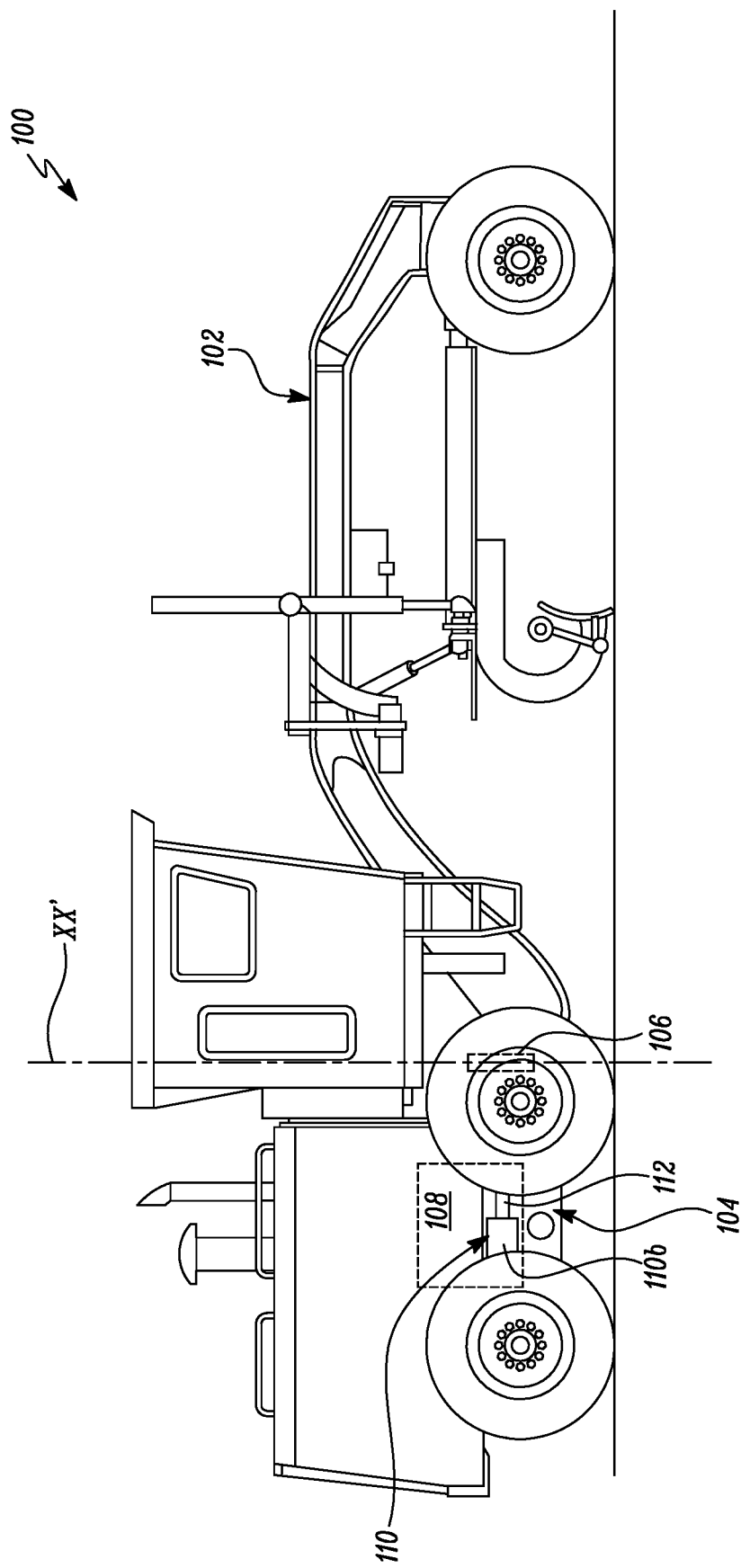
FIG. 1 is a side elevational view of an exemplary earthmoving machine having a front frame, a rear frame, and an articulation system associated with the front and rear frames, in accordance with an embodiment of the present disclosure.

Explanation will now be made in reference to the accompanying drawings. Reference numerals appearing in more than one figure indicate the same or corresponding parts in each of them.

Referring to FIG. 1, an exemplary earthmoving machine 100 is illustrated. As shown, the earthmoving machine 100 is exemplarily embodied in the form of an articulated motor grader. Although the motor grader is depicted, the present disclosure is not limited to a type of earthmoving machine used. In fact, upon reading the present disclosure, it will be acknowledged by persons skilled in the art that embodiments of the present disclosure can be similarly applied in other types of articulated machines without deviating from the spirit of the present disclosure. For sake of simplicity, the earthmoving machine 100 will hereinafter be referred to as 'the machine 100'.

As shown in FIG. 1, the machine 100 includes a front frame 102 and a rear frame 104 that are pivotally coupled to each other by an articulation joint 106. The machine 100 also includes an articulation system 108 that is associated with the front and rear frames 102, 104. The articulation system 108 includes a pair of cylinders 110 located between the front and rear frames 102, 104 of which only one cylinder 110b is shown on a side of the machine 100 and visible in the side elevation view of FIG. 1. Another cylinder 110a (refer to FIG. 2) is similarly disposed on another side of the machine 100 and located between the front and rear frames 102, 104 of the machine 100. The articulation system 108 is configured to operably articulate the front frame 102 relative to the rear frame 104, vis-à-vis the pair of cylinders 110 i.e., to cause movement of either or both the cylinders 110 for rotating the front frame 102, for example, in a clockwise or counterclockwise direction about an axis XX' of the articulation joint 106.

Figure 2:
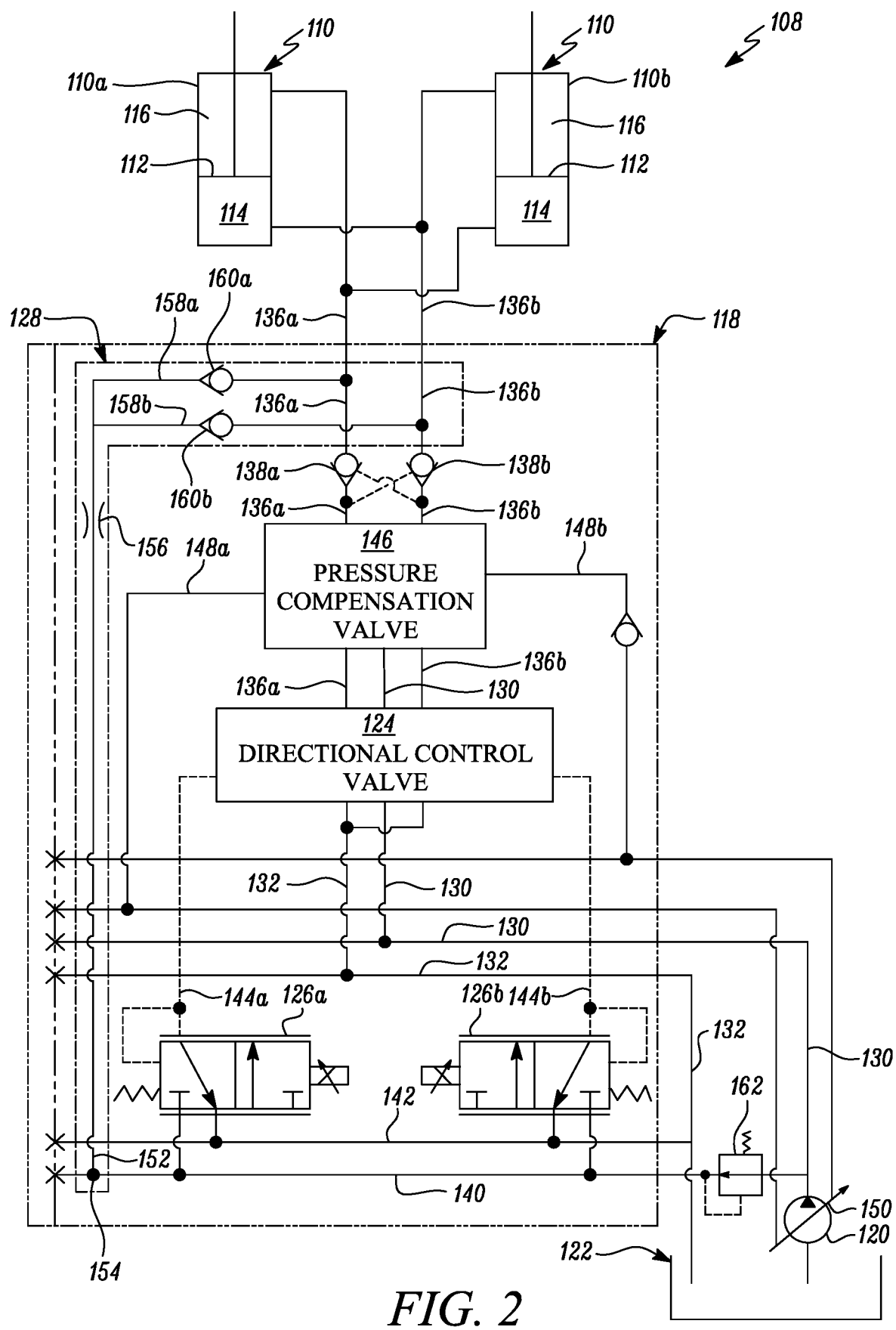
FIG. 2 is a schematic of the articulation system, in accordance with an embodiment of the present disclosure.

Referring to FIG. 2, the pair of cylinders 110 includes a left cylinder and a right cylinder denoted by respective ones of alpha-numerals '110a' and 110b. Each of the left and right cylinders 110a, 110b is a double acting cylinder that has a piston 112 slidably disposed therein and is configured to a define a cap end chamber 114 and a rod end chamber 116 together with the associated piston 112.

Further, as shown in the schematic of FIG. 2, the articulation system 108 also includes a hydraulic circuit 118 having a pump 120, a reservoir 122, a directional control valve 124, a pair of actuator valves 126a, 126b and an articulation charge circuit 128. Explanation to the components of the hydraulic circuit 118 and its working will be made hereinafter.

As shown, the directional control valve 124 is fluidly coupled to the pump 120 and the reservoir 122 via a supply line 130 and a fluid return line 132 respectively. The directional control valve 124 is also disposed in fluid communication with the pair of cylinders 110a, 110b via a pair of cylinder supply lines 136a, 136b. The pair of cylinder supply lines 136a, 136b have a pair of load check valves 138a, 138b disposed therein.

In an exemplary embodiment, the directional control valve 124 is implemented by way of an 8-port 3-position electro-hydraulically actuated valve. However, in other embodiments, the directional control valve 124 may be implemented as an electro-hydraulically actuated valve having port configurations and operational positions different from the 8-port 3-position valve disclosed herein.

Each actuator valve 126a, 126b is configured to selectively actuate movement of the directional control valve 124. In an embodiment, the pair of actuator valves 126a, 126b may be electro-mechanically operated valves i.e., spring-biased solenoid-operated electromechanical valves as shown in the schematic of FIG. 2. In alternative embodiments, the pair of actuator valves 126a, 126b may be implemented by way of hydraulically operated valves or hydro-mechanically operated valves depending on specific requirements of an application. As shown, the pair of actuator valves 126a, 126b are disposed in fluid communication with the pump 120, or another pressurized fluid source (not shown), via a pilot supply line 140. Additionally, or optionally, a pressure reducing valve 162 may be disposed in the pilot supply line 140 and located upstream of the pair of actuators 126a, 126b. The pressure reducing valve is configured to provide a pre-selected reduced pressure of fluid to the pilot supply line 140 based on specific application requirements including, but not limited to, availability of pump pressure, actuation pressure required for the pair of actuators 126a, 126b and/or other variables determined beforehand under testing of the hydraulic circuit 118 to suit such specific application requirements.

The pair of actuator valves 126a, 126b are also disposed in fluid communication with the reservoir 122 via a pilot return line 142 and the directional control valve 124 via a pair of fluid actuation lines 144a, 144b respectively. Therefore, the pair of actuator valves 126a, 126b disclosed herein are operable to actuate movement of the directional control valve 124 for selectively communicating fluid between the pair of cylinders 110a, 110b and each of the pump 120 and the reservoir 122.

In an embodiment as shown in the schematic of FIG. 2, the articulation system 108 may additionally, or optionally, include a pressure compensation valve 146 disposed between the directional control valve 124 and the pair of cylinders 110a, 110b. In an exemplary embodiment, the pressure compensation valve 146 may be implemented by way of a spring-biased pilot-operated hydromechanical valve that is configured to move from a normally restrictive position to a free flow position when a supply pressure of fluid overcomes a biasing force of the associated spring.

Further, the pressure compensation valve 146 may be fluidly coupled with the directional control valve 124 and the pair of cylinder supply lines 136a, 136b via a pressure compensation circuit (not shown) having a pair of load sense lines 148a, 148b that is connected to a displacement control 150 of the pump 120 for varying an amount of fluid displaced by the pump 120. As such, in an embodiment herein, the pump 120 may be a variable displacement pump. Although the pressure compensation valve 146 is disclosed herein, it may be noted that the pressure compensation valve 146 is non-limiting of this disclosure. In other embodiments, the pressure compensation valve 146 and any associated system hardware may be omitted from the articulation system 108 of the present disclosure without limiting the scope of the present disclosure as defined by the appended claims.

Furthermore, as shown, the articulation charge circuit 128 is associated with the pilot supply line 140 and the pair of cylinder supply lines 136a, 136b downstream of the pair of load check valves 138a, 138b. The articulation charge circuit 128 has a pilot feed line 152 branched-off from the pilot supply line 140 at a point 154 located downstream of the pair of actuator valves 126a, 126b. The pilot feed line 152 has an orifice 156 disposed therein and is configured to branch into a pair of pilot feed branch lines downstream of the orifice 156.

Further, the pair of pilot feed branch lines are fluidly coupled with the pair of cylinder supply lines 136a, 136b downstream of the pair of load check valves 138a, 138b. Furthermore, the pair of pilot feed branch lines are provided with a pair of check valves 160a, 160b disposed therein such that each check valve 160a, 160b operably charges a corresponding cylinder supply line 136a, 136b downstream of the pair of load check valves 138a, 138b with fluid from the pilot supply line 140, via the pilot feed line 152 and the orifice 156, for increasing a pressure in the corresponding cylinder supply line 136a, 136b downstream of the pair of load check valves 138a, 138b when the pressure in the corresponding cylinder supply line 136a, 136b falls below the pressure of fluid associated with the pilot feed branch line coupled thereto.

In an embodiment, the orifice 156 may be of a pre-determined width. In this embodiment, the pre-determined width of the orifice 156 may be selected for charging the cylinder supply lines 136a, 136b downstream of the pair of load check valves 138a, 138b with fluid at a pre-determined flow rate. In an embodiment, the pre-determined width of the orifice 156 may lie between 0.1-5 millimeters. In an exemplary embodiment, the pre-determined width may be 1 millimeter.

During an articulating operation, one of the actuator valves 126a/126b may be commanded to actuate movement of the directional control valve 124 into a first or a second operative position so that fluid may be supplied to pressurize the rod end chamber 116 of one of the cylinders, for example, the left cylinder 110a and the cap end chamber 114 of another of the cylinders, for example, the right cylinder 110b. With regards to the example of the foregoing articulation operation, the cap end chamber 114 of one of the cylinders, i.e., the left cylinder 110a and the rod end chamber 116 of the other of the cylinders i.e., the right cylinder 110b are simultaneously depressurized by allowing fluid to return back to the reservoir 122. This simultaneous pressurization and depressurization of opposing chambers from respective ones of the cylinders 110a, 110b causes movement of the pair of pistons 112 from the respective ones of the cylinders 110a, 110b in a pair of opposing directions for articulating the front frame 102 of the machine 100 relative to the rear frame 104.

During a holding operation, the pistons 112 from respective ones of the cylinders 110a, 110b may be held in a steady state i.e., a state in which the pistons 112 should ideally undergo no movement and no articulation of the front frame 102 should occur relative to the rear frame 104. To implement the hold state of operation, the directional control valve 124 may be disposed in a third operative position and consequently fluid is neither supplied from the pump 120 to the pair of cylinders 110a, 110b nor is any fluid returned from these cylinders 110a, 110b back to the reservoir 122.

During either of the articulating or the holding stages of operation, if the pressure in either, or both, the cylinder supply lines 136a, 136b, downstream of the pair of load check valves 138a, 138b, falls below a pressure of fluid in the pilot supply line 140, or particularly—the pilot feed line 152 downstream of the orifice 156, or more particularly, the corresponding pilot feed branch lines 158a, 158b, then the corresponding check valves 160a, 160b open to charge either, or both, the cylinder supply lines 136a, 136b downstream of the pair of load check valves 138a, 138b with fluid from the pilot supply line 140, via the pilot feed line 152 and the orifice 156, for increasing the pressure in the corresponding cylinder supply lines 136a, 136b downstream of the pair of load check valves 138a, 138b until the pressure in the corresponding cylinder supply lines 136a, 136b downstream of the pair of load check valves 138a, 138b is brought to an elevated standby pressure value i.e., a pressure value that is associated with the pilot supply line 140, or particularly—the pilot feed line 152 downstream of the orifice 156, or more particularly, the corresponding pilot feed branch lines 158a, 158b.

The elevated standby pressure value disclosed herein allows the cap end and rod end chambers 114, 116 of both cylinders 110a, 110b to remain pressurized at all times. This way, any drift i.e., a deviation from the articulation angle that is desired, or required, between the front and rear frames 102, 104 of the machine 100 can be prevented from occurring.

Various embodiments disclosed herein are to be taken in the illustrative and explanatory sense and should in no way be construed as limiting of the present disclosure. All joinder references (e.g., associated, provided, connected, coupled and the like) are only used to aid the reader's understanding of the present disclosure, and may not create limitations, particularly as to the position, orientation, or use of the control modules, the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "left", "right" or any other ordinary and/or numerical terms, should also be taken only as identifiers, to assist the reader's understanding of the various elements of the present disclosure, and may not create any limitations, particularly as to the order, or preference, of any element relative to or over another element.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims

INDUSTRIAL APPLICABILITY

The present disclosure is applicable to earthmoving machines, particularly of the articulated type, in which the machine has one or more articulating portions, for example, a front frame and a rear frame pivotally coupled about an articulation joint 106 and having two or more co-acting hydraulic cylinders for articulating the front frame relative to the rear frame.

With implementation of the articulation charge circuit 128 in the hydraulic circuit 118 of the articulation system 108 disclosed herein, the articulation system 108 is imparted with a drift prevention feature in which the articulation charge circuit 128 in the hydraulic circuit 118 of the articulation system 108 ensures that the fluid receding chambers of respective ones of the co-acting cylinders 110a, 110b are always maintained in a pressurized state to the extent of the elevated standby pressure thereby preventing drift i.e., a deviation from a desired or required articulation angle from occurring. Concomitant with the use of the articulation charge circuit 128 disclosed herein, earthmoving machines, for instance, the articulated motor grader disclosed herein may maintain the desired or required articulation angle during roading operations, or even during periods that are marked with an absence of any articulation of the front frame 102 being commanded. It is therefore envisioned that during roading operations, a quality of the roading operation achieved by the machine 100 disclosed herein may be consistent and improved than that otherwise achieved without the implementation and use of the articulation charge circuit 128.

Although other alternatives to the implementation of the articulation charge circuit 128 may be contemplated for use by persons skilled in the art, for example, by providing a dedicated charge pump to the cylinder supply lines 136a, 136b, the articulation charge circuit 128 of the present disclosure is an easy, simple and cost-effective solution that is configured to prevent drift from occurring between the front frame 102 and the rear frame 104. For implementation of the articulation charge circuit 128 disclosed herein, manufacturers may easily and conveniently modify existing components, for example, by machining an existing directional control valve and other components of an existing articulation circuit of a machine.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A hydraulic circuit for a pair of cylinders associated with an articulation system of an earthmoving machine, the hydraulic circuit comprising:
    a pump;
    a reservoir;
    a directional control valve fluidly coupled to the pump and the reservoir via a supply line and a fluid return line respectively, the directional control valve disposed in fluid communication with the pair of cylinders via a pair of cylinder supply lines, the cylinder supply lines having a pair of load check valves disposed therein; and
    a pair of actuator valves disposed in fluid communication with the pump via a pilot supply line and the directional control valve, each actuator valve configured to selectively actuate movement of the directional control valve; and
    an articulation charge circuit associated with the pilot supply line and the pair of cylinder supply lines downstream of the pair of load check valves, the articulation charge circuit having:
        a pilot feed line branched-off from the pilot supply line at a point located downstream of the pair of actuator valves, the pilot feed line having an orifice disposed therein and configured to branch into a pair of pilot feed branch lines downstream of the orifice, the pair of pilot feed branch lines fluidly coupled with the pair of cylinder supply lines downstream of the pair of load check valves, wherein:
            the pair of pilot feed branch lines are provided with a pair of check valves disposed therein such that each check valve operably charges a corresponding cylinder supply line downstream of the pair of load check valves with fluid from the pilot supply line, via the pilot feed line and the orifice, for increasing a pressure in the corresponding cylinder supply line downstream of the pair of load check valves when the pressure in the corresponding cylinder supply line falls below the pressure of fluid associated with the pilot feed branch line coupled thereto.

2. The hydraulic circuit of claim 1, wherein the orifice is of a pre-determined width.

3. The hydraulic circuit of claim 2, wherein the pre-determined width is selected so as to charge the cylinder supply lines downstream of the pair of load check valves with fluid at a pre-determined flow rate.

4. The hydraulic circuit of claim 2, wherein the pre-determined width lies between 0.1-5 millimeters.

5. The hydraulic circuit of claim 4, wherein the pre-determined width of the orifice is 1 millimeter.

6. The hydraulic circuit of claim 1, wherein the pair of actuator valves are in fluid communication with the reservoir via a pilot return line and the directional control valve via a pair of fluid actuation lines respectively.

7. The hydraulic circuit of claim 1, wherein the pair of actuator valves are operable to actuate movement of the directional control valve for communicating fluid between the pair of cylinders and each of the pump and the reservoir.

8. An articulation system for an earthmoving machine, the articulation system comprising:
- a pair of cylinders;
- a pump;
- a reservoir;
- a directional control valve fluidly coupled to the pump and the reservoir via a supply line and a fluid return line respectively, the directional control valve disposed in fluid communication with the pair of cylinders via a pair of cylinder supply lines, the pair of cylinders supply lines having a pair of load check valves disposed therein; and
- a pair of actuator valves disposed in fluid communication with the pump via a pilot supply line and the directional control valve, each actuator valve configured to selectively actuate movement of the directional control valve; and
- an articulation charge circuit associated with the pilot supply line and the pair of cylinder supply lines downstream of the pair of load check valves, the articulation charge circuit having:
  - a pilot feed line branched-off from the pilot supply line at a point located downstream of the pair of actuator valves, the pilot feed line having an orifice disposed therein and configured to branch into a pair of pilot feed branch lines downstream of the orifice, the pair of pilot feed branch lines fluidly coupled with the pair of cylinder supply lines downstream of the pair of load check valves, wherein:
    - the pair of pilot feed branch lines are provided with a pair of check valves disposed therein such that each check valve operably charges a corresponding cylinder supply line downstream of the pair of load check valves with fluid from the pilot supply line, via the pilot feed line and the orifice, for increasing a pressure in the corresponding cylinder supply line downstream of the pair of load check valves when the pressure in the corresponding cylinder supply line falls below the pressure of fluid associated with the pilot feed branch line coupled thereto.

9. The articulation system of claim 8, wherein the orifice is of a pre-determined width.

10. The articulation system of claim 9, wherein the pre-determined width is selected so as to charge the cylinder supply lines downstream of the pair of load check valves with fluid at a pre-determined flow rate.

11. The articulation system of claim 9, wherein the pre-determined width lies between 0.1-5 millimeters.

12. The articulation system of claim 11, wherein the pre-determined width of the orifice is 1 millimeter.

13. The articulation system of claim 8, wherein the pair of actuator valves are in fluid communication with the reservoir via a pilot return line and the directional control valve via a pair of fluid actuation lines respectively.

14. The articulation system of claim 8, wherein the pair of actuator valves are operable to actuate movement of the directional control valve for communicating fluid between the pair of cylinders and each of the pump and the reservoir.

15. An earthmoving machine comprising:
- a front frame and a rear frame pivotally coupled by an articulation joint, and
- an articulation system associated with the front and rear frames, the articulation system comprising:
  - a pair of cylinders located between the front and rear frames;
  - a pump;
  - a reservoir;
  - a directional control valve fluidly coupled to the pump and the reservoir via a supply line and a fluid return line respectively, the directional control valve disposed in fluid communication with the pair of cylinders via a pair of cylinder supply lines, the pair of cylinder supply lines having a pair of load check valves disposed therein; and
  - a pair of actuator valves disposed in fluid communication with the pump via a pilot supply line and the directional control valve, each actuator valve configured to selectively actuate movement of the directional control valve; and
  - an articulation charge circuit associated with the pilot supply line and the pair of cylinder supply lines downstream of the pair of load check valves, the articulation charge circuit having:
    - a pilot feed line branched-off from the pilot supply line at a point located downstream of the pair of actuator valves, the pilot feed line having an orifice disposed therein and configured to branch into a pair of pilot feed branch lines downstream of the orifice, the pair of pilot feed branch lines fluidly coupled with the pair of cylinder supply lines downstream of the pair of load check valves, wherein:
      - the pair of pilot feed branch lines are provided with a pair of check valves disposed therein such that each check valve operably charges a corresponding cylinder supply line downstream of the pair of load check valves with fluid from the pilot supply line, via the pilot feed line and the orifice, for increasing a pressure in the corresponding cylinder supply line downstream of the pair of load check valves when the pressure in the corresponding cylinder supply line falls below the pressure of fluid associated with the pilot feed branch line coupled thereto.

16. The earthmoving machine of claim 15, wherein the orifice is of a pre-determined width.

17. The earthmoving machine of claim 16, wherein the pre-determined width is selected so as to charge the cylinder supply lines downstream of the pair of load check valves with fluid at a pre-determined flow rate.

18. The earthmoving machine of claim 16, wherein the pre-determined width lies between 0.1-5 millimeters.

19. The earthmoving machine of claim 18, wherein the pre-determined width of the orifice is 1 millimeter.

20. The earthmoving machine of claim 15, wherein the pair of actuator valves are in fluid communication with the reservoir via a pilot return line and the directional control valve via a pair of fluid actuation lines respectively.

* * * * *